(12) United States Patent
McCully (10) Patent No.: US 7,071,941 B2
(45) Date of Patent: Jul. 4, 2006

(54) METHOD FOR CALCULATING CJK EMBOXES IN FONTS

(75) Inventor: Nathaniel McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 227 days.

(21) Appl. No.: 09/782,597

(22) Filed: Feb. 12, 2001

(65) Prior Publication Data

US 2003/0151607 A1 Aug. 14, 2003

Related U.S. Application Data

(60) Provisional application No. 60/182,126, filed on Feb. 12, 2000.

(51) Int. Cl.
*G06T 11/00* (2006.01)

(52) U.S. Cl. .................. 345/469; 345/471; 715/535

(58) Field of Classification Search ..... 345/467–472.3, 345/171, 947, 948, 25, 26; 382/181, 183, 382/185, 199, 200, 229, 276, 301; 717/517, 717/535; 715/535; G06T 11/00; G09G 5/22, G09G 5/32, 5/00; G09F 17/20
See application file for complete search history.

(56) References Cited

U.S. PATENT DOCUMENTS

| | | | |
|---|---|---|---|
| 4,284,975 A | 8/1981 | Odaka | |
| 4,291,381 A | 9/1981 | Siebeck | |
| 4,591,999 A | 5/1986 | Logan | |
| 4,608,664 A | 8/1986 | Bartlett et al. | |
| 4,833,627 A | 5/1989 | Leszczynski | |
| 5,018,083 A | 5/1991 | Watanabe et al. | |
| 5,175,806 A | 12/1992 | Muskovitz et al. | |
| 5,287,443 A | 2/1994 | Mameda et al. | |
| 5,399,029 A | 3/1995 | Muraoka et al. | |
| 5,416,898 A | 5/1995 | Opstad et al. | |
| 5,432,890 A | 7/1995 | Watanabe | |
| 5,500,931 A | 3/1996 | Sonnenschein | |
| 5,501,538 A | 3/1996 | Sawada et al. | |
| 5,548,700 A | 8/1996 | Bagley et al. | |
| 5,579,471 A | 11/1996 | Barber et al. | |

(Continued)

FOREIGN PATENT DOCUMENTS

JP 61-282974 12/1986

(Continued)

OTHER PUBLICATIONS

U.S. Appl. No. 09/964,293, filed Sep. 25, 2001, Shade et al.

(Continued)

*Primary Examiner*—Alexander Eisen
(74) *Attorney, Agent, or Firm*—Fish & Richardson P.C.

(57) ABSTRACT

Methods and apparatus, including computer program products, implementing and using techniques for typesetting a text line of characters with different fonts or different sizes without the presence of a preset baseline in the font. A coordination line is set for the text line to coordinate the characters. The dimensions of each character to be typeset on the text line is first determined. An embox is determined for each character, where the vertical and horizontal size of each embox are the determined dimensions for the character. The characters are compared with at least one preselected reference character of the same font, and a coordination point is determined for each character in its embox, based on the result of the comparison with the reference character. Finally the coordination point is coordinated for each of the characters with the coordination line in order to typeset the characters on the text line.

25 Claims, 8 Drawing Sheets

U.S. PATENT DOCUMENTS

| | | |
|---|---|---|
| 5,581,670 A | 12/1996 | Bier et al. |
| 5,617,115 A | 4/1997 | Itoh et al. |
| 5,724,072 A | 3/1998 | Freeman et al. |
| 5,724,596 A | 3/1998 | Lathrop |
| 5,778,403 A | 7/1998 | Bangs |
| 5,802,532 A | 9/1998 | Nakayama et al. |
| 5,803,629 A | 9/1998 | Neville et al. |
| 5,805,167 A | 9/1998 | Van Cruyningen |
| 5,809,166 A | 9/1998 | Huang et al. |
| 5,937,420 A | 8/1999 | Karow et al. |
| 6,088,520 A | 7/2000 | Taoka et al. |
| 6,321,243 B1 | 11/2001 | Ballard |
| 6,330,577 B1 | 12/2001 | Kim |
| 6,359,630 B1 | 3/2002 | Morse et al. |
| 6,426,751 B1 * | 7/2002 | Patel et al. ............... 345/468 |
| 6,504,544 B1 * | 1/2003 | Hollingsworth et al. .... 345/467 |
| 6,510,441 B1 | 1/2003 | Kenninga |
| 6,624,814 B1 | 9/2003 | Karow et al. |
| 2001/0048764 A1 * | 12/2001 | Betrisey et al. ............ 382/162 |
| 2002/0062324 A1 | 5/2002 | McCully et al. |

FOREIGN PATENT DOCUMENTS

| | | |
|---|---|---|
| JP | 1-125656 | 5/1989 |
| JP | 1-271275 | 10/1989 |
| JP | 02-213983 | 8/1990 |
| JP | 04-052871 | 2/1992 |
| JP | 05-224651 | 9/1993 |
| JP | 6-20026 | 1/1994 |
| JP | 06-020026 A * | 1/1994 |
| JP | 06-96174 | 4/1994 |
| JP | 06-149806 | 5/1994 |
| JP | 07-096594 | 4/1995 |
| JP | 07-149005 | 6/1995 |
| JP | 7-182303 | 7/1995 |
| JP | 8-137871 | 5/1996 |
| JP | 8-161309 | 6/1996 |
| JP | 08-194832 | 7/1996 |
| JP | 8-314655 | 11/1996 |
| JP | 10-069477 | 3/1998 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

Hirschberg, D.S. et al., "New Applications of Failure Functions", *Journal of the Association for Computing Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

* cited by examiner

METHOD FOR CALCULATING CJK EMBOXES IN FONTS

CROSS-REFERENCE TO RELATED APPLICATIONS

This application claims the benefit of U.S. Provisional Patent Application No. 60/182,126 for "Method for Calculating CJK Emboxes in Fonts" filed Feb. 12, 2000, the disclosure of which is incorporated herein by reference in its entirety.

TECHNICAL FIELD

The invention pertains in general to desktop publishing (DTP) technology, and more specifically to line typesetting technology in DTP.

BACKGROUND

A reference line known as a baseline is set in the digital fonts used in DTP, and in the case of CJK (ideographic characters such as Chinese, Japanese, Korean, etc.) fonts, which include Japanese fonts, a baseline for each character is usually set. When performing line typesetting, if Japanese text and European-language text are mixed together in one text line, a common baseline is used for the respective fonts in order to adjust the relative positional relationship of Japanese text and the European-language text.

Figure 13:
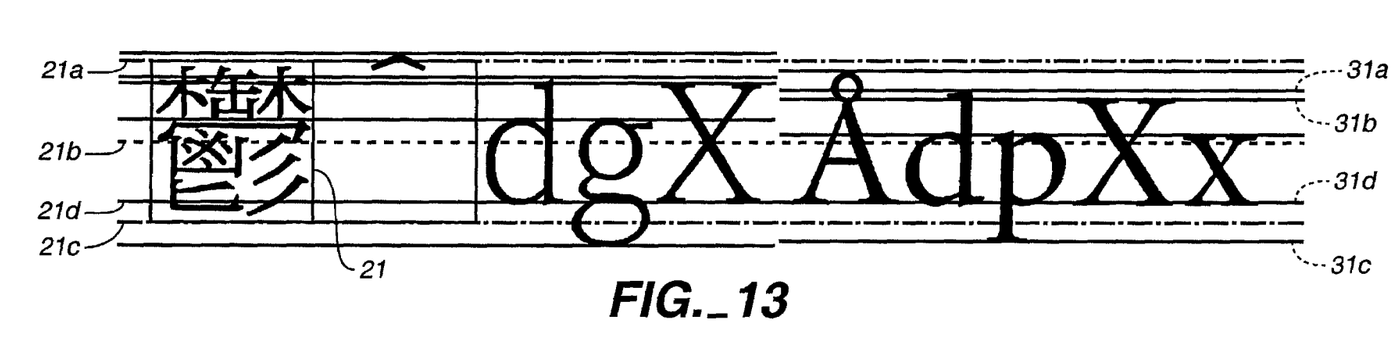
FIG. 13 is a schematic diagram showing a comparison of Japanese font reference lines and European language font reference lines.

FIG. 13 shows the situation where line typesetting text contains a mixture of Japanese and a European language. The first five characters, "utsu" through the first "X" from the left, are created in a Japanese font, and the next five characters, "angstrom" through "x", are created in a European-language font. In the Japanese font, a single character is arranged inside essentially square-shaped embox 21 (also referred to as "imaginary body"). Embox 21 has a top part 21a, middle part 21b, and bottom part 21c. The vertical distance between the top part 21a and bottom part 21c of the embox 21 demarcates the height of the embox. In addition, a baseline 21d is set for the embox for these Japanese characters. European-language fonts, on the other hand, have an ascender line 31a, a cap line 31b, a baseline 31d, and a descender line 31c. The vertical distance between cap line 31b and baseline 31d sets the cap height, i.e. the height of a European-language en uppercase letter, an en being half the width of an em. In FIG. 13, line typesetting is performed by coordinating baseline 21d for Japanese fonts and baseline 31d for European-language fonts.

However, while a baseline is set in CJK fonts, including Japanese fonts, in Japanese fonts the baseline position has no direct significance on the relationship with the embox, so the baseline is independently and optionally set by the font designer. Therefore the position of the baseline is not identical in all CJK fonts, and is as a general principle different for each font. When a person considers whether the line typesetting condition of text containing the mixture of Japanese and a European language shown in FIG. 13 is suitable, and replaces one font of Japanese characters with a different font of Japanese characters, that person can expect a line typesetting situation that is different from the one shown in FIG. 13. The baseline on the Japanese or European-language side will be vertically offset with regard to the other baseline, and needs to be repositioned. Therefore it is necessary to use a computer mouse and manually correct the position, or input numerical values via a keyboard and move the text.

Figure 14:
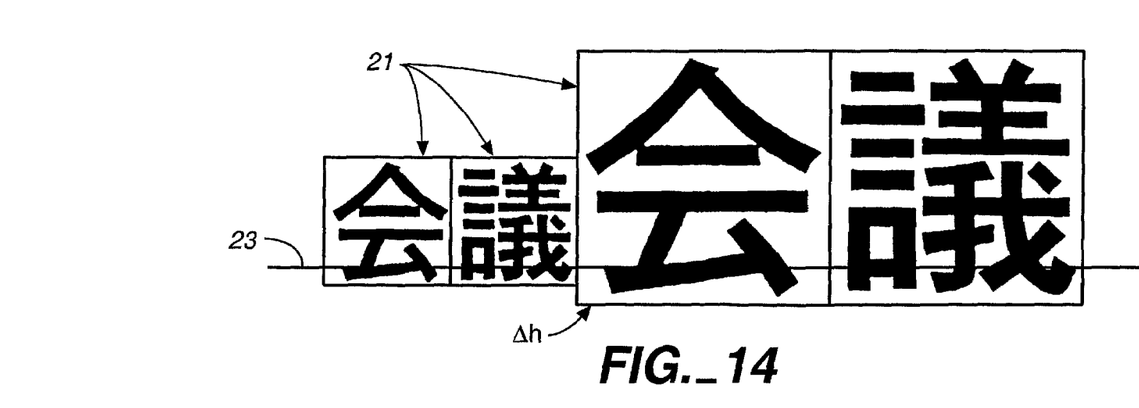
FIG. 14 is a schematic diagram showing a prior art example of using a preset font baseline for coordinating on a coordination line.

In addition, when character dimensions (for example point dimensions) in a given font change, the absolute position becomes more offset as the size of the characters increases, even when the relative position of the baselines is the same. Therefore, as shown in FIG. 14, when characters with different point dimensions in the same font are coordinated on coordination line 23 using their respective baselines, the lower part of the big characters projects downward compared to the small characters. That is, in emboxes 21 of different sized characters in FIG. 14, a part of the bottom of the big embox projects downward by exactly Δh compared to the small embox. This sort of line typesetting state is not permitted in Japanese typesetting, and therefore it is necessary to use a mouse or keyboard and manually correct the line typesetting.

SUMMARY

In general, in one aspect, the invention provides methods and apparatus, including computer program products, implementing and using techniques for typesetting a text line. A coordination line is set for the text line to coordinate a plurality of characters for typesetting the text line. The dimensions of each of the plurality of characters to be typeset on the text line is determined. An embox for each of the plurality of characters is determined, each embox having a vertical and horizontal size being the determined dimensions. Each character to be typeset on the text line is compared with at least one preselected reference character belonging to the same font, and a coordination point for each of the characters in their said respective embox is determined based on the result of the comparison. The coordination point for each of the plurality of characters is then coordinated with the coordination line to typeset the characters on the text line.

Implementations can include one or more of the following features. The dimensions may be point dimensions and the reference character may have the same point dimension as each character that will undergo the coordination. The characters to be typeset can be a CJK (ideographic characters, such as Chinese, Japanese or Korean) font character. The reference character may be a European-language en uppercase letter having a cap height. The reference character may alternatively be an en H or an en X. The comparison of each of the plurality of characters may include determining a glyph bounding box for the reference character, centrally positioning the bounding box in the embox and determining the coordination point of the embox. The coordination point may be an intersection point with the top, middle or bottom of the embox, or with the bounding box.

The largest character having the largest point dimension may be found among the characters to be typeset, setting the line height to be the height of the largest character and centrally positioning the characters that have been coordinated with a coordination line within the line height. The comparison of the characters may include determining the glyph bounding box for the reference character, determining the average value for the top, bottom, left, and right differences between the embox and the bounding box, determining an ideographic character face box located inside and separated from the embox edges by exactly the average value and determining the coordination point based on the ideographic character face box. More than one, for example N (N≧2) reference characters may be present, and if so determining the average value may include dividing the sum of the top, bottom, left, and right differences obtained for the N reference characters by 4N to determine the average value.

Comparing each of the plurality of characters may alternatively include determining a glyph bounding box for the reference character, determining a first average value for the top and bottom difference between the embox and the bounding box, determining a second average value for the left and right difference, determining an ideographic character face box located inside and separated from the embox edges by exactly the average value, and determining the coordination point based on the ideographic character face box. The reference character may have a glyph whose shape is close to square, and may include the Japanese ideographs "utsu" and "naga."

In general, in another aspect, the invention provides a desktop publishing system (DTP) for controlling typesetting of a text line. The DTP system includes a DTP processing control device, a display device for displaying data that is being typeset and input means for receiving user input. The DTP processing control device is provided with a font file and with typesetting control means. The font file contains character font information for performing typesetting. The typesetting control means have a text line typesetting control means adapted to arrange characters to be coordinated with a coordination line of a text line. The arranging is carried out by determining an embox for the characters, each embox having a vertical and horizontal size corresponding to the dimensions of its associated character, determining a coordination point by comparing each of the plurality of said characters with at least one preselected reference character belonging to the same font, and performing line typesetting processing by coordinating each determined coordination point with said coordination line.

Potential advantages of the invention may include one or more of the following. The invention may make it possible to perform line typesetting precisely and attractively even when a plurality of characters includes different fonts or dimensions. In addition, the invention may eliminate the sort of positional offset that occurs with characters that cause positional offset when a line is typeset based on the baseline set by the font designer. The elimination can be done automatically and without requiring manual operation, and thereby make it possible to perform the desired line typesetting efficiently. The invention may eliminate the conventional typesetting, and may provide a line typesetting technology that can correctly align a plurality of characters in one line without the presence of a preset baseline in a font. The invention may also provide a line typesetting technology that can determine a new coordination point for each character and align a plurality of characters in one line using those coordination points.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The following explanation deals mainly with horizontal typesetting, but it should be noted that the inventive line typesetting control technique can be applied to both horizontal typesetting and to vertical typesetting.

Figure 1:
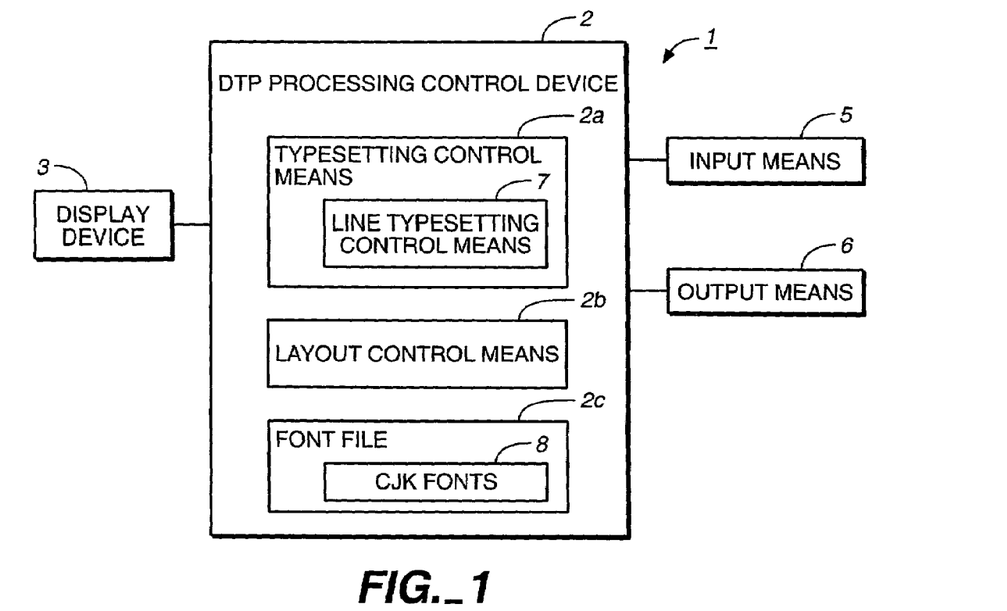
FIG. 1 is a schematic block diagram showing a DTP system capable of line typesetting control in accordance with the invention.

FIG. 1 shows an electronic typesetting DTP system 1 in accordance with one implementation of the invention. DTP system 1 has a DTP processing control device 2, for performing electronic typesetting and layout editing and so forth, a display device 3 for displaying the data being processed, an input means 5 for inputting various types of data such as graphics, text, control instructions, etc., and an output means 6 for outputting processed data. DTP processing control device 2 has typesetting control means 2a, which controls typesetting, layout control means 2b, which controls layout editing, and font file 2c, which stores font information about attributes of the text to be output on a display or printed, etc. In particular, font file 2c includes CJK fonts 8, which are fonts for ideographic characters such as Japanese, Chinese, Korean, etc. In addition, typesetting control means 2a has line typesetting control means 7, which arranges a plurality of characters being typeset in electronic typesetting within one line.

Display device 3 can comprise various types of display devices such as a CRT or a LCD, etc. Input means 5 can include a keyboard, a pointing device (mouse, track ball, track point, etc.), a scanner, a communication interface, etc. In addition, output means 6 can comprise a printer, an external memory device, etc. DTP processing control device 2 can include a processor such as a CPU, etc., or a memory, or an electronic typesetting processing program, etc. that includes a line typesetting control routine that is loaded into the memory and processed by a processor. On the other hand, DTP processing control device 2 can also be constituted in part or in whole as hardware or firmware.

Figure 2:
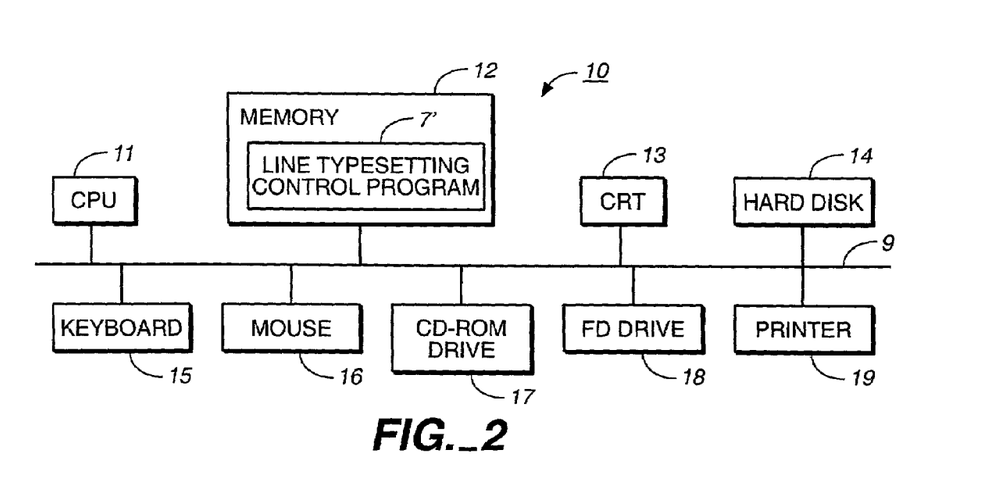
FIG. 2 is a schematic block diagram showing a DTP system capable of line typesetting control in accordance with the invention.

FIG. 2 is a block diagram showing a DTP system 10 provided with the line typesetting control function in accordance with the present invention, implemented in a general-purpose computer system. The system 10 shown in FIG. 2 has a CPU 11, a memory 12, a CRT 13, a hard disk 14, a keyboard 15, a mouse 16, a CD-ROM drive 17, a FD drive 18 and a printer 19. These units are coupled and work together via a bus 9. In electronic typesetting in accordance with the present invention, a line typesetting control program 7' is a routine with other electronic typesetting programs, for example, and is installed in system 10 via CD-ROM drive 17 or FD drive 18, and stored for example on hard disk 14. In addition, font file 2c can also be stored on hard disk 14. Then, when the line typesetting control program 7' or an electronic typesetting program containing the line typesetting control program is started by a user operating keyboard 15 or mouse 16, the line typesetting control program is loaded into memory 12 as shown in the diagram. This line typesetting control means 7 can be constituted as CPU 11 and line typesetting control program 7' loaded into memory 12. In one aspect of the invention, a computer-readable recording medium (for example, CD-ROM, FD, tape, semiconductor memory, etc.) storing a line typesetting control program is provided so that a general-purpose computer system can be converted into a DTP system providing a line typesetting control function in accordance with the present invention.

Figure 3:
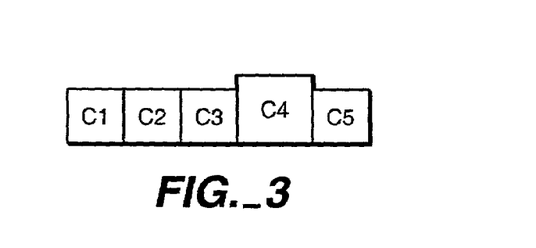
FIG. 3 is a schematic diagram showing a plurality of characters to be line typeset within one line in accordance with the invention.

FIG. 3 schematically shows a series of text data comprising a plurality of characters C1–C5. FIG. 3 shows the status when these characters C1–C5 are input by a user operating a keyboard, for example, or input via input means 5 from a storage medium such as a FD, and stored in a storage medium in DTP processing control device 2. It is assumed that these characters C1–C5 are merely shown in their numerical sequence and by differences in their embox dimensions, that typesetting processing based on the inventive line typesetting control is performed on these characters C1–C5 and that the characters are arranged in a specified coordinated state within one line. Furthermore, each character Ci has at least font information and dimension (for example, point dimensions) information as its attributes.

Figure 4:
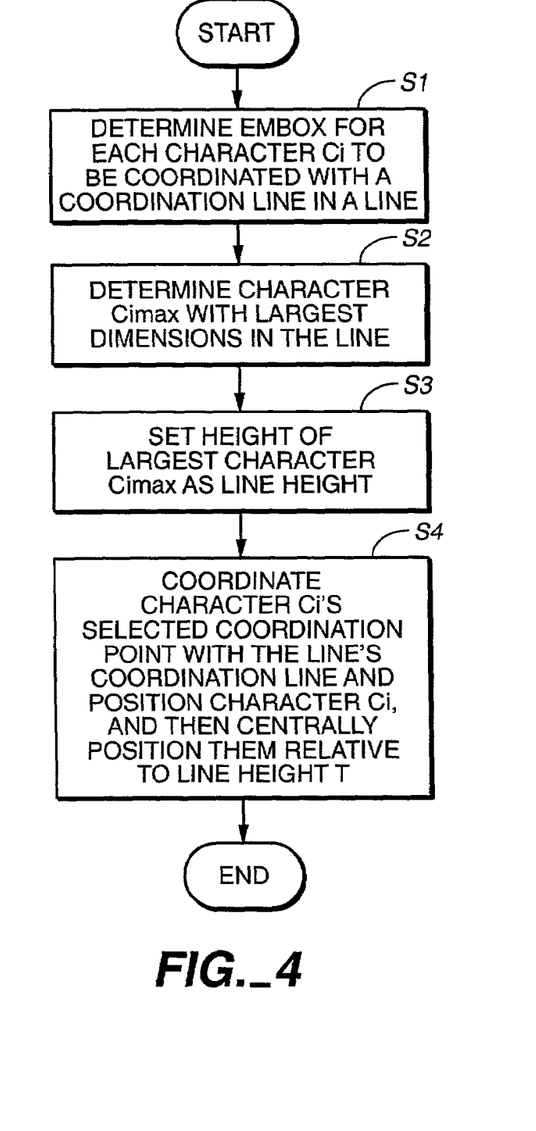
FIG. 4 is a flowchart showing the line typesetting control procedure in accordance with the invention.

FIG. 4 shows a flowchart of the line typesetting control procedure for coordinating characters within a line based on emboxes in accordance with one aspect of the invention. That is, when starting line typesetting processing of a plurality of characters in DTP system 1 or 10 as shown in FIG. 1 or 2, an embox is first determined for each character Ci (i=1–5 in the example shown in FIG. 3) among the characters to be coordinated on a coordination line (for example, a reference line) within a text line (step S1). Furthermore, an embox in the invention corresponds to a so-called "imaginary body", and outlines the outermost sides of the character. The embox is an essentially square-shaped outer frame demarcated horizontally and vertically by the character's dimensions (for example, point dimension). Furthermore, determining the embox for each character Ci in step S1 means that it is possible to coordinate character Ci, based on the determined embox, with the coordination line for the text line, and consequently determining the embox includes determining a new coordination point for that embox.

Figure 5:
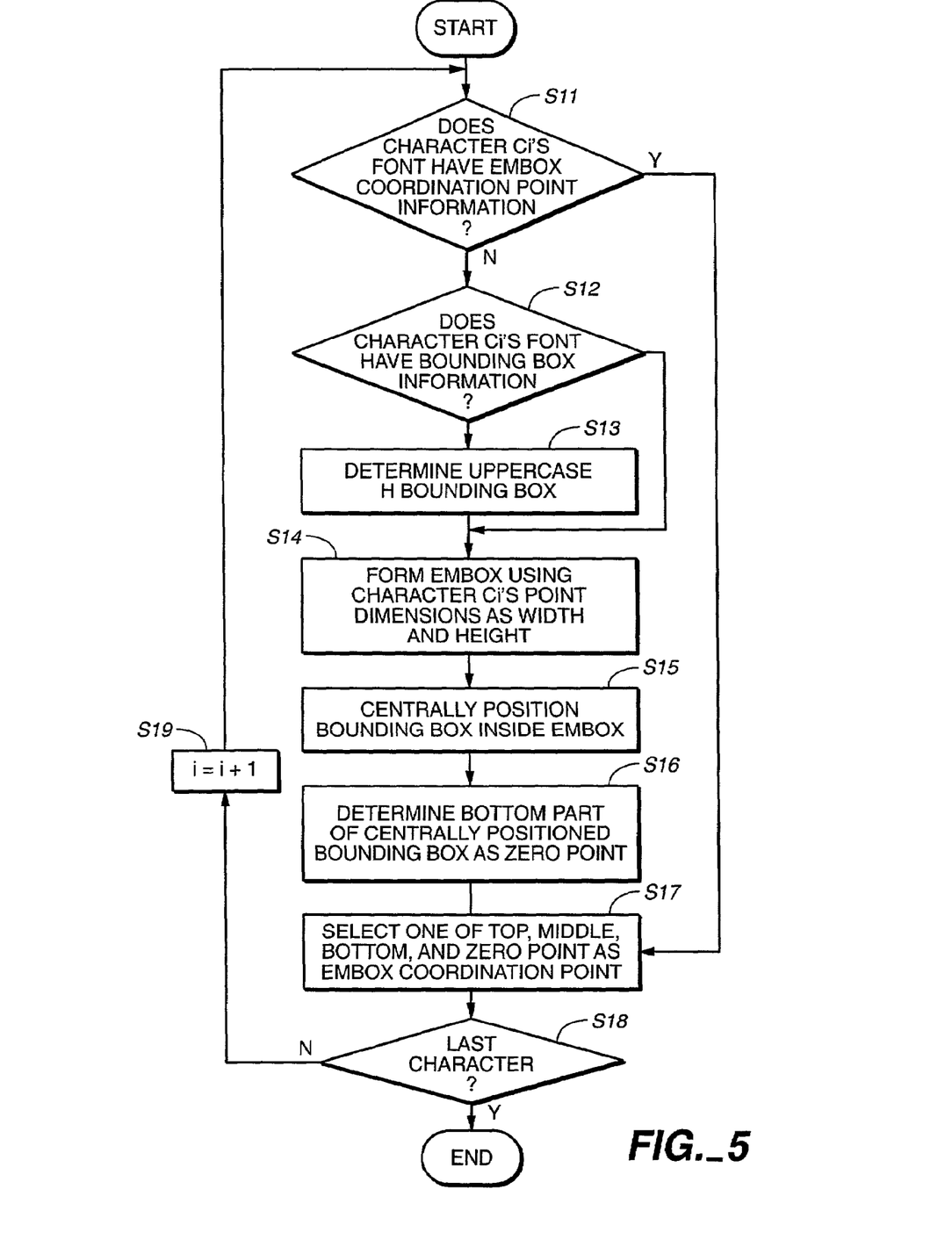
FIG. 5 is a flowchart showing a procedure for determining an embox for a character in FIG. 4.

FIG. 5 shows a flowchart of a procedure for determining a new embox coordination point in a preferred implementation of the invention in step S1 of the flowchart in FIG. 4. FIGS. 6A–E are schematic diagrams showing an example of determining an embox coordination point using the procedure of the FIG. 5 flowchart. That is, as shown in the FIG. 5 flowchart, a decision is first made as to whether or not the font of character C1 (in this example, 12-point character "gi" 20) has embox coordination point information (step S11). If the font of character C1 has embox coordination point information, the embox coordination point for character C1 can be determined based on that coordination point information, and the flow branches to step S18. If embox coordination point information is not present, or if it is present but the necessary coordination point cannot be determined from the embox information, the flow moves to step S12, and a decision is made as to whether or not it is possible to acquire a preselected reference character's (in this example "utsu" and "naga") bounding box information for character C1's font. A bounding box is a box comprising a pair of horizontal lines and a pair of vertical lines surrounding character C1's glyph. The bounding box is usually slightly smaller than character C1's embox and housed inside the embox. If bounding box information can be acquired, the embox's relative position is calculated using the bounding box information, and the flow moves to step S14 in order to determine the position of character C1. If there is no bounding box information, the flow moves to step S13 in order to determine the bounding box by another method.

In step S13 bounding box 22a is determined for a predetermined reference character (in this example, a 12-point en uppercase "H") 22 with the same dimensions (in this example, 12 points) and the same font as the font of character C1. Furthermore, an en uppercase "H" is 12 points in dimension but its cap height is about 10 points. This implementation uses an en uppercase "H" as a reference character, but the reference character in this case is not limited to an en uppercase "H". Basically, it is possible to use a character that belongs to the same font and has the same cap height as character C1; for example, an en uppercase "X" can be used as the reference character. A character that has a cap height is one whose lower edge corresponds to the font's baseline.

Next, in step S14, embox 21 is formed having width and height that are the point dimensions (12 points, in this example) of character C1. Furthermore, step S14 can also be executed before step S12.

Next, the reference character's (in this example an en uppercase "H") bounding box 22a is centrally positioned inside embox 21 (step S15). On the other hand, it is also possible to centrally position bounding box 22a together with an en uppercase "H", the reference character, inside embox 21. Next, the centrally positioned bounding box 22a or the bottom part (lower edge) of an en uppercase "H" is determined as the new zero point of embox 21 (step S16). In addition, at least one of the top part, middle part, bottom part, and zero point of the embox is determined as the reference point (coordination point) of embox 21 (step S17).

Figures 6A, 6B:
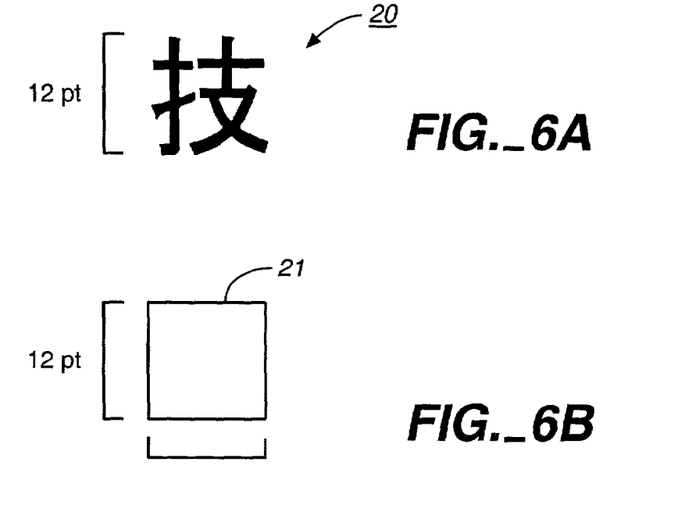
FIGS. 6A–6E are schematic diagrams showing the steps of determining an embox for the Japanese ideograph "gi" and determining the intersection point of the bottom extension line for the bounding box of H and the embox to be the coordination point in the procedure shown in the flowchart in FIG. 5.
Figure 6C:
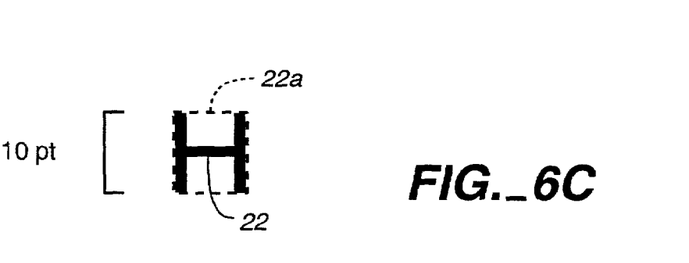
Figure 6D:
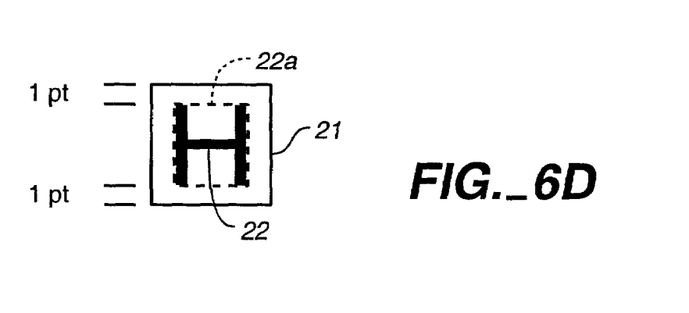
Figure 6E:
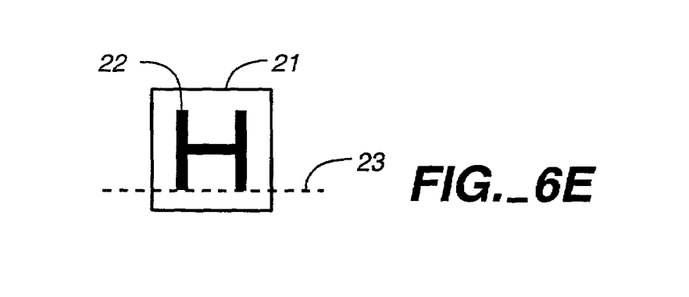

Character C1 can be positioned at a specified position in the text line by coordinating the reference point (coordination point) determined in this manner with the coordination line in the text line. Furthermore, FIG. 6E shows the situation when the zero point (that is, bounding box 22a's bottom part (lower edge)) of embox 21 determined by the procedure described above is designated to be the coordination point, and that coordination point is coordinated with the coordination line 23 for the text line. A horizontal line passing through the zero point of embox 21 can therefore be viewed as the corrected baseline for character 20.

In this implementation of the invention, embox 21 is formed so that its vertical and horizontal dimensions are the point dimensions of character 20, and a new coordination point is determined to be the corrected baseline (zero point) for embox 21 so that embox 21, and thus character 20, can be coordinated with the coordination line 23 for the text line and positioned using the new coordination point. In addition, it is also possible to determine another optional point on embox 21 as a different coordination point based on the new coordination point determined in the same manner. That is, it is possible to determine a radically corrected baseline based on the basic principle of this implementation of the invention, regardless of which font character 20 belongs to. Therefore, for example, when typesetting a plurality of characters belonging to different fonts, or a plurality of characters belonging to the same font but having different sizes, a new corrected baseline is determined. The new corrected baseline is a reference point (coordination point) determined based on a shared basic principle for all of the characters in the text line. Line typesetting is performed based on the reference point (coordination point), and thereby it is possible to achieve the desired attractive-looking results.

Processing of character C1 ends as described above and the FIG. 5 procedure loops back and returns to step S11 where the same sort of processing is repeated for the next character C2. When character C2 belongs to the same font as character C1 and also has the same dimensions (point size), it is possible to use the coordination point determined for character C1 and avoid repeating the same processing for C2 as for C1. This is however not shown in the FIG. 5 flowchart. Using the coordination point determined for character C1 may increase processing speed. On the other hand, if either the font type or the dimensions are different, and character C2 is different from character C1, the procedure in FIG. 5 is repeated again for character C2. For example, if characters C1, C2, C3, and C5 among the five characters shown in FIG. 3 belong to the same font and have the same dimensions, and character C4 belongs to the same font as the other characters but has different dimensions, the coordination point determined for character C1 through the procedure in FIG. 5 is applied as-is to characters C2, C3, and C5. Therefore the procedure in FIG. 5 is not repeated for characters C2, C3, and C5, which increases processing efficiency. Character C4, on the other hand, has dimensions that are different from those of the other characters, so the procedure in FIG. 5 is executed again and a coordination point for character C4 is individually determined.

As described above, emboxes and coordination points are individually determined for the five characters C1–C5 in FIG. 3 (step S1). Returning to FIG. 4, the character having the largest dimensions (in this case, character C4) in the plurality of characters C1–C5 to be arranged within one text line is designated as Cimax (step S2). Next, the height of Cimax, the line height T for the text line is set to be the same as the height of the character with the largest dimensions (step S3). The characters C1–C5 are then positioned by coordinating their individually determined reference points (coordination points) with the reference line (coordination line) for the text line, after which the characters are centrally positioned with regard to line height T (step S4). This ends line typesetting processing for characters C1–C5.

Figure 7A:
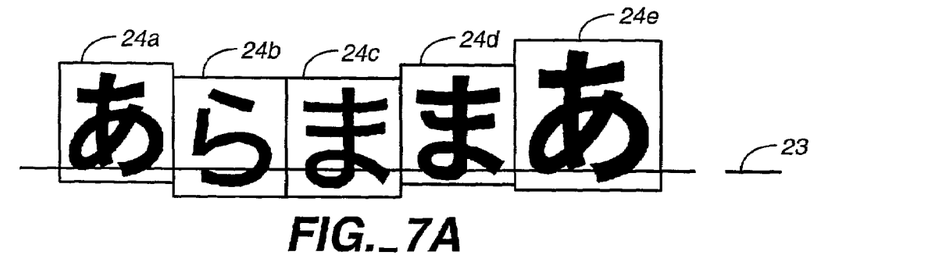
FIGS. 7A–7B are schematic diagrams showing how five CSK characters of different fonts and dimensions are coordinated on a coordination line in prior art and in accordance with the invention.
Figure 7B:
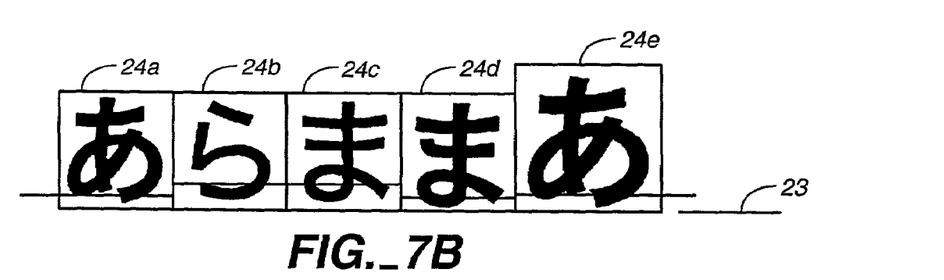

FIGS. 7A and B show the situation when five Japanese characters 24a–24e undergo line typesetting processing in accordance with prior art and the inventive technique, respectively, and are coordinated on coordination line 23. Furthermore, it is assumed that characters 24a–24d all have the same dimensions and that characters 24a, 24d, and 24e belong to the same font, which is different from the font to which characters 24b and 24c belong. Additionally, it is assumed that character 24a and character 24d have the same dimensions and that character 24e is larger than the other characters. FIG. 7A shows the case where characters 24a–24e are each positioned in coordination with coordination line 23, which is a preset baseline (that is, a baseline that was stipulated by the designer for each of these characters individually). On the other hand, FIG. 7B shows a case in which a new embox is determined for each character 24a–24e based on the implementation described with reference to FIGS. 4 through 6, and the characters are positioned with the bottom part of the newly determined embox coordinated with coordination line 23.

Figure 8A:
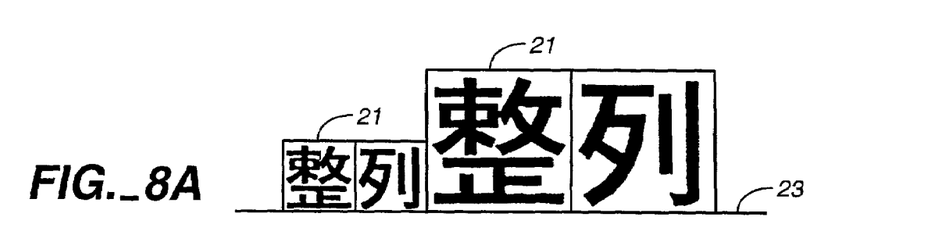
FIGS. 8A–8C are schematic diagrams showing the character alignment state when characters are coordinated on a coordination line using the bottom part coordination point, the top part coordination point, and the middle part coordination point, respectively, of emboxes determined in accordance with the invention.
Figure 8B:
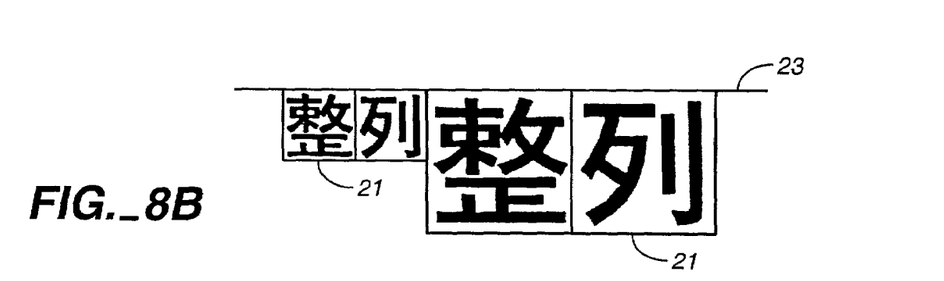
Figure 8C:
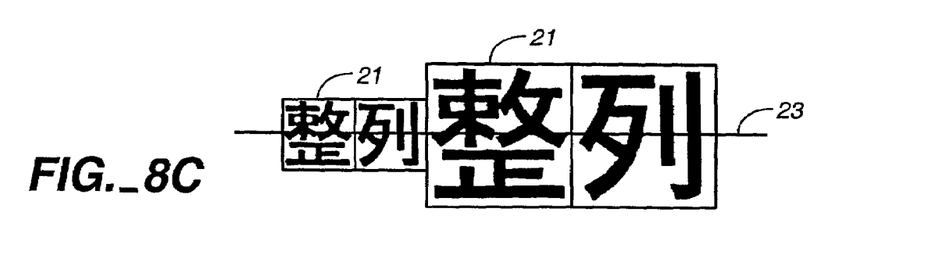
Figure 9:
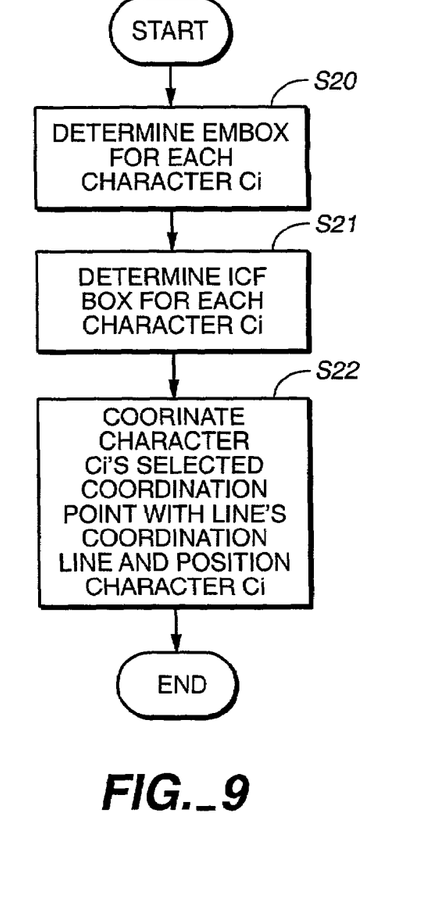
FIG. 9 is a flowchart showing the line typesetting control procedure in accordance with another implementation of the invention.

FIGS. 8A–C show the states when the bottom part, top part, or middle part, respectively, of embox 21 determined according to the inventive line typesetting control procedure explained with reference to FIGS. 4 through 6 is coordinated with coordination line 23 as the new coordination point. All of the examples are examples of horizontal typesetting, but the invention can also be applied to vertical typesetting, of course.

Next, with reference to FIGS. 9 through 12, a line typesetting control procedure based on another implementation of the invention will be explained. In the line typesetting control procedure in this case it is assumed that line typesetting is performed on the series of characters comprising the plurality of characters C1–C5 shown in FIG. 3. As shown in the flowchart in FIG. 9, embox 21 is first determined for character C1 (step S20). Embox 21 in this case has the same structure as embox 21 in the previously described implementation. Therefore embox 21 is determined as an essentially square frame whose vertical and horizontal dimensions are the dimensions of character C1 (for example, point dimensions).

Figure 10:
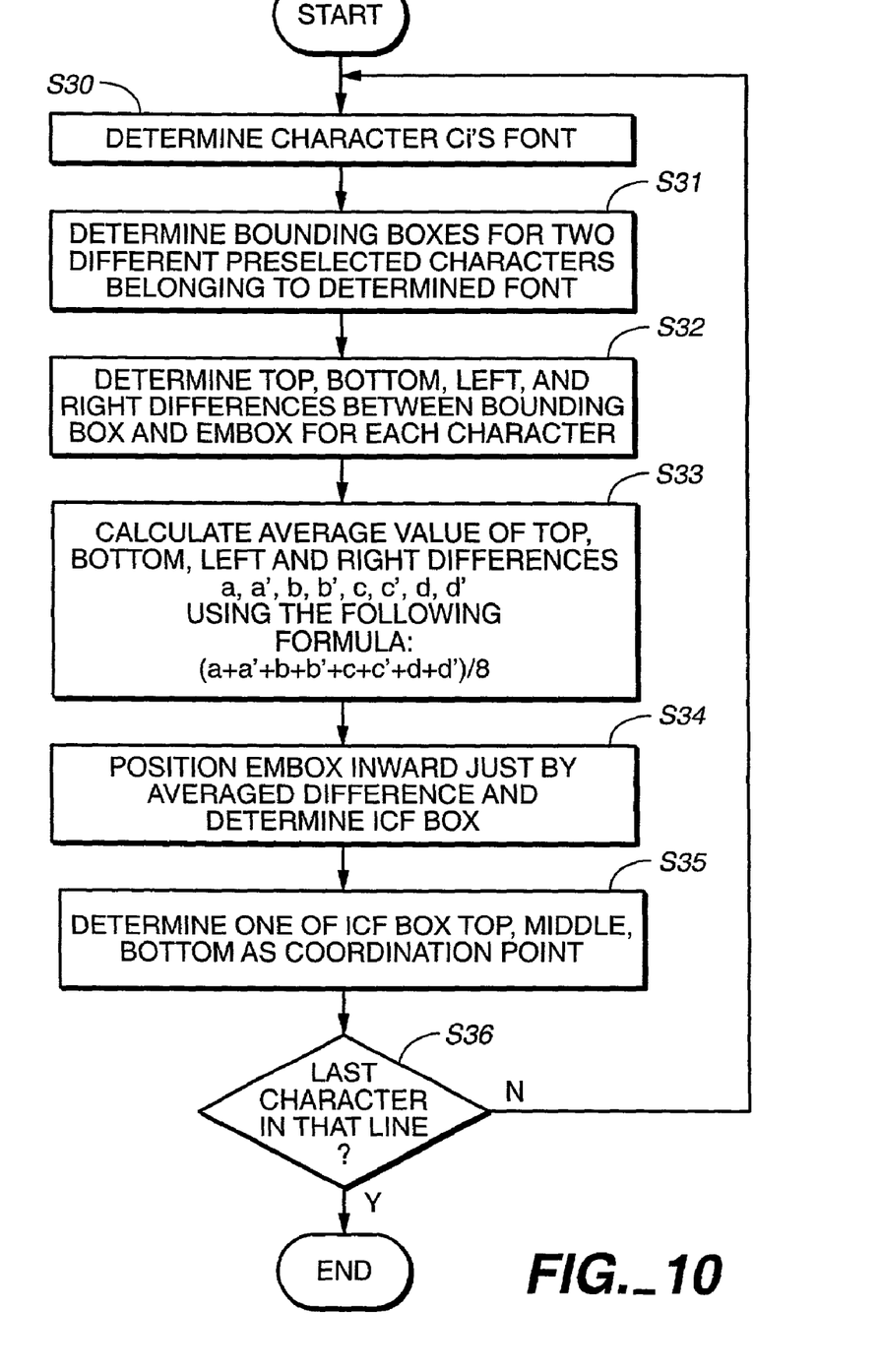
FIG. 10 is a flowchart showing a procedure for determining the ICF box in step S21 in FIG. 9.

Next, an ICF (Ideographic Character Face) box is determined for character C1 (step S21). ICF here is an ideographic character face, also known as average face. FIG. 10 shows one implementation of the routine for determining an ICF box. The procedure for determining an ICF box and its coordination point will be described with reference to FIGS. 10 and 11.

Figure 11A:
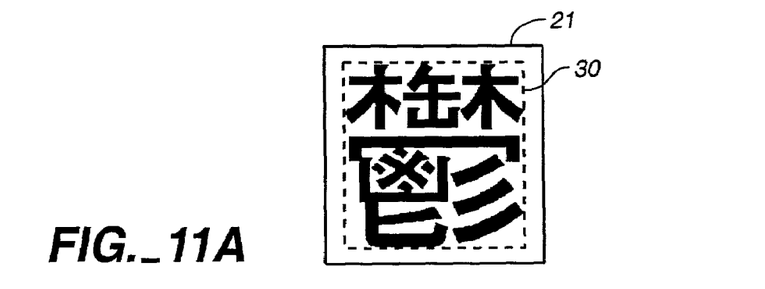
FIGS. 11A–11C are schematic diagrams showing the relationship between two reference characters, their emboxes and their bounding boxes that can be used in the procedure in FIG. 10.
Figure 11B:
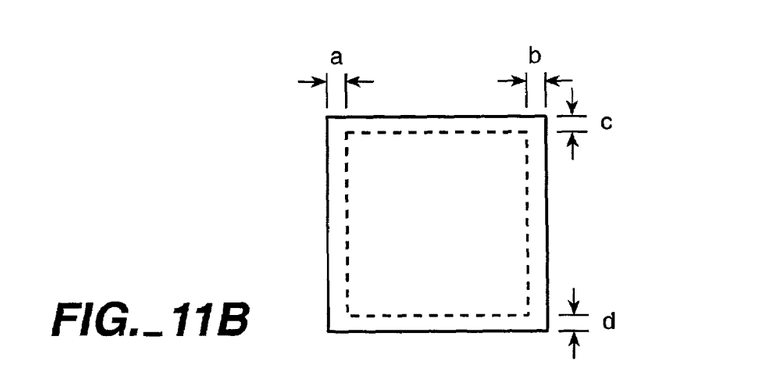
Figure 11C:
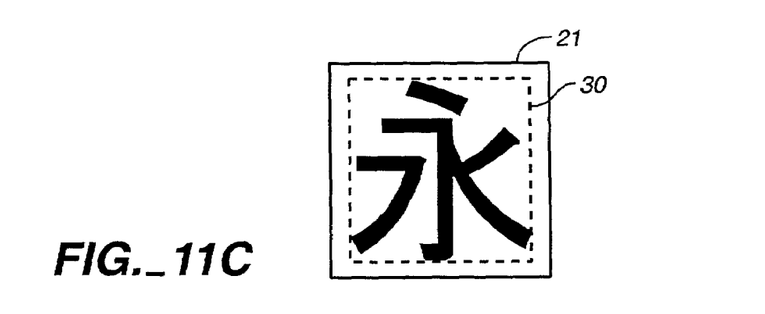

First, the font of character C1 is determined (step S30). Next, bounding boxes are determined for two mutually different predetermined reference characters belonging to the determined font. Furthermore, the two characters "utsu" and "naga" as shown in FIGS. 11A and 11C are used as the two mutually different predetermined reference characters in this implementation. However, the reference characters are not limited to these two specific characters; it is also possible to use other characters as the reference characters in other implementations. The other characters can be used if they satisfy three conditions: (1) their glyphs are relatively square in shape, (2) they are kanji, and (3) their dimensions are as large as possible. Furthermore, "naga" is used as a reference character in this implementation. This reference character has a shape that deviates somewhat from being square, but it is used as a reference character because it is a classic kanji character that reflects excellent balance in font design. Therefore in this implementation it was decided to make the font's optimal ICF box determinable using the two characters "utsu" and "naga" as reference characters.

Furthermore, this implementation uses two reference characters, but the number of reference characters is not limited to two. It is possible to use one, three, or a larger optional number of reference characters. Nevertheless, the more reference characters that are used, the greater the increase in precision can be achieved, but processing time increases (particularly processing time for determining the bounding box). In order to achieve satisfactory precision without a dramatic delay, using two reference characters is preferred in this implementation.

As the result of processing step S31, in this implementation, as shown in FIG. 11A, bounding box 30 for the first reference character "utsu" is determined and, as shown in FIG. 11C, bounding box 30 for the second reference character "naga" is determined. Next, as shown in FIG. 11B, the top, bottom, left and right differences a, a', b, b', c, c', d, d' between bounding box 30 and embox 21 are determined for each reference character (step S32). Next, these eight differences are added, and the result of the addition is divided by 8 to determine the average value of the differences (step S33). A new box is defined that is positioned inside embox 21 by exactly the distance of the average value obtained for the difference in this manner. This box becomes ICF box 31 (see FIG. 12) (step S34). Next, either the top part, the middle part, or the bottom part of ICF box 31 is selected to be the coordination point (step S35). This is how ICF box 31 is determined for character C1 and its coordination point is also determined. If any characters, from a line of characters, remain, the process repeats for the next character (step S36).

Next, the same processing is performed for the next character C2, but in this case, if character C2 and character C1 belong to the same font and have the same dimensions, the various parameter values already determined in processing character C1 can be used as is, and of course it is not necessary to repeat the same processing again. However, if the character to be processed next has a different font has the same font but a different size (for example, character C4), the entire procedure in FIG. 10 needs to be executed again. In this way the individual coordination points for each character C1–C5 are determined based on the ICF boxes (step S21 in FIG. 9). By arranging characters C1–C5 with their respective coordination points coordinated on a coordination line within a text line it is possible to accurately and attractively position characters C1–C5 (step S22).

Figure 12:
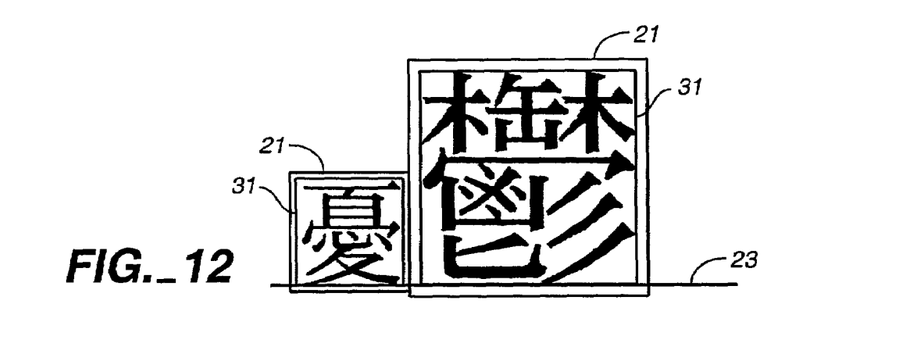
FIG. 12 is a schematic diagram showing the processing result based on the ICF box in accordance with the invention.

FIG. 12 shows an example where ICF box 31 is determined based on the aforesaid implementation and characters are coordinated on coordination line 23 with the bottom part of ICF box 31 as the coordination point. In this case the emboxes of adjacent characters are offset and are not coordinated, but their ICF boxes are coordinated at the bottom part on coordination line 23. ICF boxes determine the relative positional relationship between pairs of adjacent glyphs based on characters' actual glyphs, so this makes it possible to perform line typesetting with a higher degree of precision than line typesetting procedures based on emboxes. Therefore, particularly when performing line typesetting on large characters, a line typesetting procedure based on ICF boxes should be used. However, a line typesetting procedure based on ICF boxes requires calculating glyph bounding boxes, so the processing time tends to increase.

Furthermore, in the implementation described above, one position-the ICF box's top part, middle part, or bottom part—could be selected as the coordination point, but of course it is possible to select other optional points on ICF box 31 as a coordination point. In the implementation described above, an average value was calculated for the top, bottom, left and right differences between the reference character's glyph bounding box and the embox of the character under study when determining the ICF box. In another preferred implementation a first average value is determined for the top and bottom differences and a second average value is determined for the left and right differences between the reference character's glyph bounding box and the embox of the character under study. The ICF box can be determined inside the embox and separated vertically and horizontally by exactly the first and second average values, respectively. In addition, the invention can of course be applied to European-language fonts as well as Japanese fonts. That is, an embox can for example be determined for a European-language font, and characters can be arranged along a coordination line using that embox.

The invention may be implemented as a desktop publishing system that is provided with an improved line typesetting control function, as an improved line typesetting control method that can be processed by a computer, or as a computer-readable recording medium storing an improved line typesetting control program.

A number of implementations of the invention have been described. Nevertheless, it will be understood that various modifications may be made without departing from the spirit and scope of the invention. Accordingly, other implementations are within the scope of the following claims.

What is claimed is:

1. A method for typesetting a text line, comprising:
  determining dimensions of each of a plurality of characters to be typeset on a text line;
  associating a distinct embox with each of the plurality of characters, each embox having an outer frame demarcated by the dimensions of the associated character of the plurality of characters;
  associating a reference character with each of the plurality of characters, each associated reference character being one of one or more preselected reference characters, each reference character of the one or more preselected reference characters having the same font and dimensions as the associated character of the plurality of characters;
  using the associated reference character to determine a coordination point for each distinct embox and thereby determine a coordination point for each of the plurality of characters; and
  aligning each distinct embox with a coordination line using the determined coordination point for each of the plurality of characters to typeset the plurality of characters on the text line.

2. The method of claim 1, wherein each of the plurality of characters has a point dimension and the one or more preselected reference characters include reference characters having the same point dimensions as found among the plurality of characters.

3. The method of claim 2, wherein the one or more preselected reference characters are each a CJK font character.

4. The method of claim 1, wherein the one or more preselected reference characters are each a European-language en uppercase letter having a cap height.

5. The method of claim 4, wherein the one or more preselected reference characters are each an en H or an en X.

6. The method of claim 1, wherein determining the coordination point for each of the plurality of characters comprises:
   determining a glyph bounding box for the one or more preselected reference characters;
   centrally positioning the glyph bounding box in each distinct embox; and
   determining a point on the glyph bounding box as the coordination point of each distinct embox.

7. The method of claim 1, further comprising:
   finding a largest character having a largest point dimension among said plurality of characters;
   setting a line height for the text line to be a height of said largest character; and
   aligning the coordination point of each of the plurality of characters with a coordination line for the text line.

8. The method of claim 1, wherein determining the coordination point for each of the plurality of characters comprises:
   determining a glyph bounding box for the one or more preselected reference characters;
   determining an average value for top, bottom, left, and right differences between said embox and said glyph bounding box;
   determining an ideographic character face box located inside and separated from said embox edges by the average value; and
   determining a point on the ideographic character face box as the coordination point.

9. The method of claim 8, wherein N (N≧2) reference characters are present, and determining the average value comprises dividing the sum of the top, bottom, left, and right differences obtained for the N reference characters by 4N to determine said average value.

10. The method of claim 1, wherein determining the coordination point for each of the plurality of characters comprises:
    determining a glyph bounding box for the one or more preselected reference characters;
    determining a first average value for a top and bottom difference between the embox and the glyph bounding box;
    determining a second average value for a left and right difference;
    determining an ideographic character face box located inside and separated from said embox top and bottom edges by the first average value and the embox left and right edges by the second average value; and
    determining a point on the ideographic character face box as the coordination point.

11. The method of claim 8, wherein the one or more preselected reference characters include a glyph whose shape is substantially a square.

12. The method of claim 11, wherein the one or more preselected reference characters include the Japanese ideographs "utsu" and "naga."

13. A computer program product, stored on a machine-readable medium, comprising instructions operable to cause a programmable processor to:
    select a coordination line for the text line to coordinate a plurality of characters for typesetting the text line,
    determine the dimensions of each of the plurality of characters to be typeset on the text line,
    associate a distinct embox with each of the plurality of characters, each embox having an outer frame demarcated by the dimensions of the associated character of the plurality of characters;
    associate a reference character with each of the plurality of characters, each associated reference character being one of one or more preselected reference characters, each reference character of the one or more preselected reference characters having the same font and dimensions as the associated character of the plurality of characters;
    use the associated reference character to determine a coordination point for each distinct embox and thereby determine a coordination point for each of the plurality of characters; and
    align each distinct embox with the coordination line using the determined coordination point for each of the plurality of characters to typeset the plurality of characters on the text line.

14. The product of claim 13, wherein each of the plurality of characters has a point dimension and the one or more preselected reference characters include reference characters having the same point dimensions as found among the plurality of characters.

15. The product of claim 14, wherein the one or more preselected reference characters are each a CJK font character.

16. The product of claim 13, wherein the one or more preselected reference characters are each a European-language en uppercase letter having a cap height.

17. The product of claim 16, wherein the one or more preselected reference characters are each an en H or an en X.

18. The product of claim 13, wherein the instructions to determine the coordination point for each of the plurality of characters comprise instructions to:
    determine a glyph bounding box for the one or more preselected reference characters;
    centrally position the glyph bounding box in each distinct embox; and
    determine a paint on the glyph bounding box as to coordination paint of each distinct embox.

19. The product of claim 13, further comprising instructions to:
    find a largest character having a largest point dimension among said plurality of characters;
    set a line height for the text line to be a height of said largest character; and
    align the coordination point for each of the plurality of characters with a coordination line for the text line.

20. The product of claim 13, wherein the instructions to determine the coordination point for each of the plurality of characters comprise instructions to:
    determine a glyph bounding box for the one or more preselected reference characters;
    determine an average value for top, bottom, left, and right differences between said embox and said glyph bounding box;
    determine an ideographic character face box located inside and separated from said embox edges by the average value; and
    determine a point on the ideographic character face box as the coordination point.

21. The product of claim 20, wherein N (N≧2) reference characters are present, and the instructions to determine the average value comprise dividing the sum of the top, bottom, left, and right differences obtained for the N reference characters by 4N to determine said average value.

22. The product of claim 13, wherein the instructions to determine the coordination point for each of the plurality of characters comprise instructions to:
   determine a glyph bounding box for the one or more preselected reference characters;
   determine a first average value for a top and bottom difference between said embox and said glyph bounding box;
   determine a second average value for a left and right difference;
   determine an ideographic character face box located inside and separated from said embox top and bottom edges by the first average value and the embox left and right edges by the second average value; and
   determine a point on the ideographic character face box as the coordination point.

23. The product of claim 20, wherein the one or more preselected reference characters include a glyph whose shape is substantially a square.

24. The product of claim 23, wherein the one or more preselected reference characters include the Japanese ideographs "utsu" and "naga."

25. A desktop publishing system for controlling typesetting of a text line, comprising:
   a desktop publishing processing control device provided with a font file and with typesetting control means, the font file containing character font information for performing typesetting;
   a display device for displaying data that is being typeset; and
   input means for receiving user input;
   said typesetting control means having a text line typesetting control means adapted to arranging a plurality of characters to be coordinated with a coordination line of a text line by
   determining dimensions of each of the plurality of characters to be typeset on the text line,
   associating a distinct embox with each of the plurality of characters, each embox having an outer frame demarcated by the dimensions of the associated character of the plurality of characters,
   associating with each of the plurality of characters a reference character, each associated reference character being one of one or more preselected reference characters, each reference character of the one or more preselected reference characters having the same font and dimensions as the associated character of the plurality of characters,
   using the associated reference character to determine a coordination point for each distinct embox and thereby determine a coordination point for each of the plurality of characters, and
   performing line typesetting processing by aligning each distinct embox with the coordination line using to determined coordination point for each of the plurality of characters.

* * * * *

UNITED STATES PATENT AND TRADEMARK OFFICE
CERTIFICATE OF CORRECTION

| | | |
|---|---|---|
| PATENT NO. | : 7,071,941 B2 | Page 1 of 1 |
| APPLICATION NO. | : 09/782597 | |
| DATED | : July 4, 2006 | |
| INVENTOR(S) | : Nathaniel M. McCully | |

It is certified that error appears in the above-identified patent and that said Letters Patent is hereby corrected as shown below:

Column 11, line 35, delete "$\geqq$" and replace with --$\geq$--;

Column 12, line 42, delete "paint" and replace with --point--, and delete "to" and replace with --the--;
line 43, delete "paint" and replace with --point--;
line 65, delete "$\geqq$" and replace with --$\geq$--;

Column 14, line 16, delete the second occurrence of "of" and replace with --or--;
line 26, delete "to" and replace with --the--.

Signed and Sealed this
Sixteenth Day of October, 2012

David J. Kappos
*Director of the United States Patent and Trademark Office*